United States Patent
Hagihara (10) Patent No.: US 7,551,788 B2
(45) Date of Patent: Jun. 23, 2009

(54) DIGITAL IMAGE CODING DEVICE AND METHOD FOR NOISE REMOVAL USING WAVELET TRANSFORMS

(75) Inventor: Hayato Hagihara, Tokyo (JP)

(73) Assignee: NEC Corporation, Tokyo (JP)

(*) Notice: Subject to any disclaimer, the term of this patent is extended or adjusted under 35 U.S.C. 154(b) by 1076 days.

(21) Appl. No.: 10/610,592

(22) Filed: Jul. 2, 2003

(65) Prior Publication Data

US 2004/0006582 A1    Jan. 8, 2004

(30) Foreign Application Priority Data

Jul. 3, 2002    (JP)    ............... 2002-194050

(51) Int. Cl.
*G06K 9/46*    (2006.01)
*G06K 9/00*    (2006.01)

(52) U.S. Cl. .................. 382/240; 382/252; 382/247; 382/232

(58) Field of Classification Search ............... 382/240, 382/252, 247, 232
See application file for complete search history.

(56) References Cited

U.S. PATENT DOCUMENTS 6,512,853 B2 * 1/2003 Kennedy et al. ........... 382/238
6,985,632 B2 * 1/2006 Sato et al. .................. 382/240

2002/0003905 A1    1/2002   Sato et al.

FOREIGN PATENT DOCUMENTS

JP    61-260769    11/1986
JP    05-083129    4/1993

* cited by examiner

*Primary Examiner*—John B Strege
(74) *Attorney, Agent, or Firm*—Foley & Lardner LLP

(57) ABSTRACT

A digital image coding device based on wavelet transform technology includes a lower-bitplane replacement section which is provided after a coefficient modeling section and before an arithmetic coding section. The coefficient modeling section converts wavelet coefficients into binary data composed of a plurality of bitplanes for each code-block. The lower-bitplane replacement section replaces a designated number of lower-order bitplanes of the plurality of bitplanes with zero to produce modified binary data. The designated number of low-order bitplanes is designated depending on a noise characteristic of the image capturing device. The arithmetic coding section codes bitplanes of the modified binary data.

9 Claims, 8 Drawing Sheets

FIG.4A

| | |
|---|---|
| 1LL | 1HL |
| 1LH | 1HH |

FIG.4B

| 2LL | 2HL | 1HL |
|---|---|---|
| 2LH | 2HH | |
| 1LH | | 1HH |

FIG.5

|   |    |    |   |
|---|----|----|---|
| 0 | 12 | 0  | 7 |
| 0 | 0  | -6 | 0 |
| -2| 0  | 0  | 0 |
| 0 | 1  | 0  | 0 |

COEFFICIENTS

MSB

| 0 | 1 | 0 | 0 |
|---|---|---|---|
| 0 | 0 | 0 | 0 |
| 0 | 0 | 0 | 0 |
| 0 | 0 | 0 | 0 |

| 0 | 1 | 0 | 1 |
|---|---|---|---|
| 0 | 0 | 1 | 0 |
| 0 | 0 | 0 | 0 |
| 0 | 0 | 0 | 0 |

| 0 | 0 | 0 | 1 |
|---|---|---|---|
| 0 | 0 | 1 | 0 |
| 1 | 0 | 0 | 0 |
| 0 | 0 | 0 | 0 |

| 0 | 0 | 0 | 1 |
|---|---|---|---|
| 0 | 0 | 0 | 0 |
| 0 | 0 | 0 | 0 |
| 0 | 1 | 0 | 0 |

LSB

BITPLANE REPRESENTATION

FIG. 6A

| 189 | 191 | 190 | 195 | 190 | 195 | 189 | 193 |
|-----|-----|-----|-----|-----|-----|-----|-----|
| 192 | 194 | 195 | 189 | 195 | 190 | 189 | 190 |
| 195 | 193 | 189 | 195 | 189 | 194 | 192 | 195 |
| 192 | 193 | 194 | 190 | 195 | 193 | 189 | 192 |
| 191 | 191 | 193 | 195 | 190 | 189 | 195 | 195 |
| 195 | 189 | 195 | 189 | 192 | 192 | 189 | 194 |
| 193 | 194 | 192 | 189 | 193 | 190 | 192 | 195 |
| 192 | 189 | 194 | 195 | 193 | 192 | 190 | 191 |

| 62 | 65 | 65 | 63 |
|----|----|----|----|
| 67 | 65 | 65 | 64 |
| 64 | 66 | 63 | 64 |
| 64 | 65 | 64 | 65 |

| 2  | 1  | 1  | 0  |
|----|----|----|----|
| 0  | -4 | 1  | 2  |
| -1 | 3  | 1  | 3  |
| -4 | 0  | 3  | 3  |

| 3  | -2 | -2 | 3  |
|----|----|----|----|
| 0  | 0  | -2 | 2  |
| 2  | -1 | -1 | 2  |
| 0  | -2 | 5  | -1 |

| 5  | 12 | 5  | -7 |
|----|----|----|----|
| 2  | -2 | -6 | -9 |
| -2 | -2 | -1 | -4 |
| 1  | 1  | -5 | -6 |

FIG.7

DIGITAL IMAGE CODING DEVICE AND METHOD FOR NOISE REMOVAL USING WAVELET TRANSFORMS

BACKGROUND OF THE INVENTION

1. Field of the Invention

The present invention relates to a digital image coding technique, and in particular to a digital image coding device and method which compresses digital image data inputted from an image input device, a still-image capturing device, and the like.

2. Description of the Related Art

With the widespread use of information processing devices such as personal computers, an increasing number of image scanners or digital cameras have been widely used to input still images into personal computers. Captured still images may be attached to e-mails, presentation documents or Homepages on the Internet. In such a situation that digital imagery is expanding in quality, size and application, there is a growing need for image compression with flexibility and efficiency. The still-image input devices also use an image compression system to store compressed image data.

To efficiently compress a still image with high quality, JPEG (Joint Photographic Experts Group) and then JPEG2000 have been proposed. JPEG2000 is an image coding system employing compression techniques based on wavelet transform technology and has various significant advantages over existing image compression standards. For example, JPEG2000 can provide both lossy and lossless compression and especially allows lossless compression at the same performance level as the original JPEG.

In general, a JPEG2000 coding system is composed of a DC level conversion section, a color transform section, wavelet transform section, quantization section, coefficient modeling section, arithmetic coding section, and code-ordering control section.

However, digital image data inputted from an image capturing device such as an image scanner or digital camera inevitably includes noises which are caused by image sensor, analog circuit, analog-to-digital converter, and the like. Accordingly, when an analog image signal is converted into digital form, several low-order bits of the digital image signal reflect noises and such noise-reflected digital image signal is converted into coefficients by the wavelet transform, resulting in the coefficients to be subject to code modeling having magnitudes influenced by the noises. More specifically, the coefficients obtained by the wavelet transform are divided into a plurality of sub-bitplanes before arithmetic coding. Accordingly, several lower-order sub-bitplanes reflecting the noises are encoded by the arithmetic coder, resulting in an increased amount of code data.

SUMMARY OF THE INVENTION

An object of the present invention is to provide a digital image coding device and method allowing an increased compression rate with no image degradation.

Another object of the present invention is to provide a digital image coding device and method which can efficiently remove noises from image data inputted from an image capturing device.

According to the present invention, a device for coding a digital image signal inputted from an image capturing device based on wavelet transform, includes: a coefficient modeling section for converting wavelet coefficients into binary data composed of a plurality of bitplanes for each code-block; a replacement section for replacing a designated number of lower-order bitplanes of the plurality of bitplanes with zero to produce modified binary data, wherein the designated number of low-order bitplanes is designated depending on a noise characteristic of the image capturing device; and an arithmetic coding section for coding bitplanes of the modified binary data.

The lower-order bitplanes to be replaced with zero may belong to AC components at a minimum decomposition level.

The noise characteristic of the image capturing device may be obtained by capturing a reference image having a uniform intensity and quantizing an intensity deviation of a captured image.

The lower-order bitplanes to be replaced with zero may belong to AC components at a designated one of a predetermined number of decomposition levels.

As described above, in a JPEG2000 coding system, the lower-bitplane replacement section is provided after the coefficient modeling section and before the arithmetic coding section. The number of lower-order bitplanes reflecting noises is previously determined depending on the noise characteristic of an image capturing device or the like, By replacing the designated lower-order bitplanes with zero, noise components included in the input image data can be effectively removed without deteriorating image quality and the compression rate can be improved.

DESCRIPTION OF THE PREFERRED EMBODIMENTS

Figure 1:
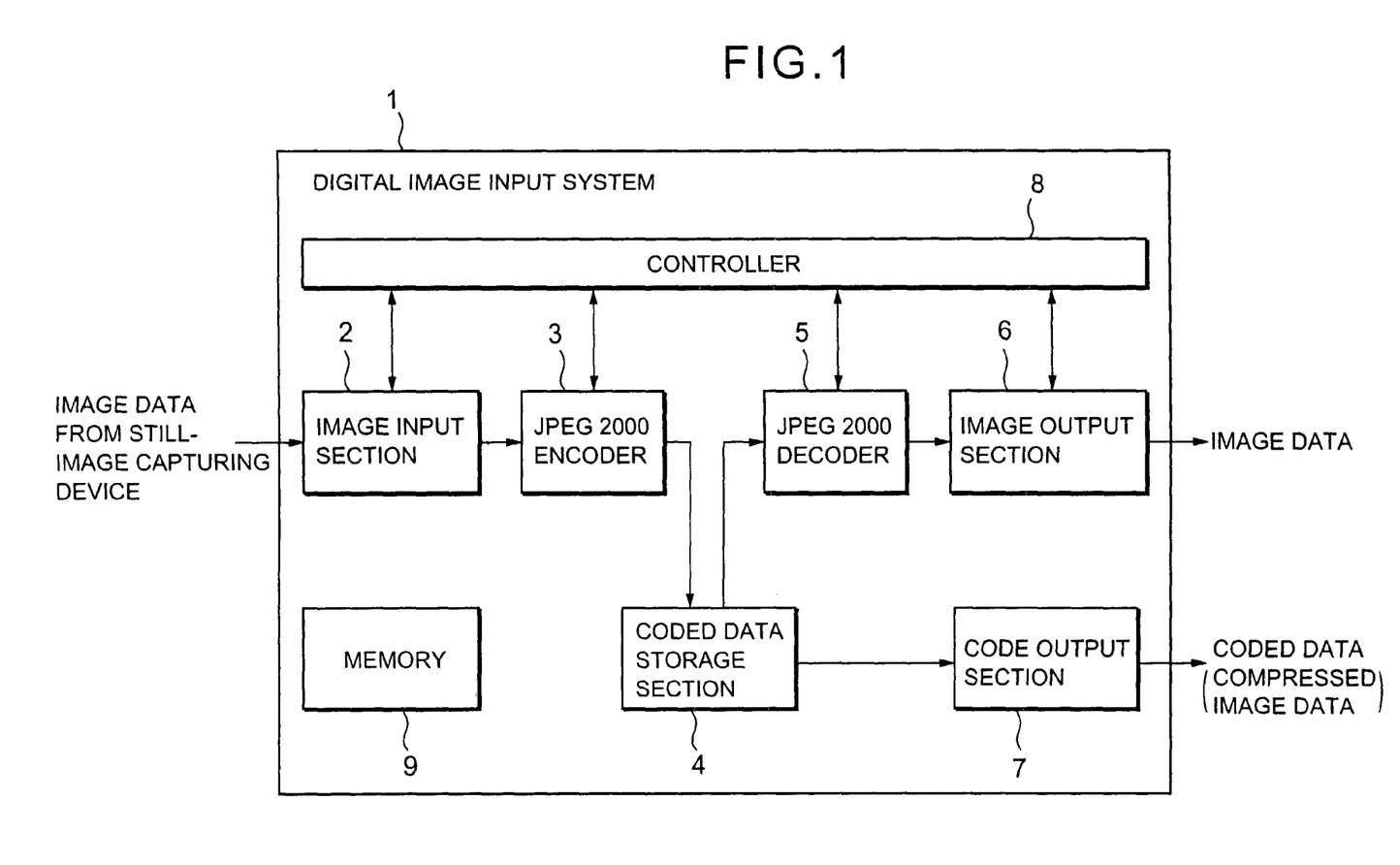
FIG. 1 is a block diagram showing a digital image input system employing a digital image coding device according to the present invention.

Referring to FIG. 1, a digital image input system 1 inputs image data from a still-image capturing device (not shown), stores compressed image data, and outputs decompressed image data and compressed image data. The digital image input system 1 inputs the image data at an image input section 2. The input image data is compressed by a JPEG2000 encoder 3 and the compressed image data is stored in a data storage section 4. The data storage section 4 may be a semiconductor memory, a magnetic disk device such as HDD, a magneto-optical disk or another type of storage device.

The digital image input system 1 is further provided with a JPEG2000 decoder 5, which decodes the compressed image data stored in the data storage section 4 to output decoded image data to a printer, a display device or the like through an image output section 6.

The compressed image data stored in the data storage section 4 can be also output through a code output section 7 in the case of the Internet or facsimile communication or when the compressed image data is sent to a device equipped with a JPEG2000 decoder. Such a JPEG2000 decoder may have an ordinary JPEG2000 decoding function.

The entire operation of the digital image input system 1 including the JPEG2000 coding and decoding is controlled by a controller 8. Alternatively, the image input section 2, the JPEG2000 encoder 3, the JPEG2000 decoder 5, the image output section 6, and the code output section 7 may be functionally implemented by a program-controlled processor or computer running programs including a JPEG2000 coding program stored in a memory 9. The JPEG2000 encoder 3 and/or the JPEG2000 decoder 5 may be implemented by a LSI (Large-scale Integrated circuit) or a combination of LSI and software.

Hereinafter, the functional structure and operation of the JPEG2000 encoder 3 according to the first embodiment of the present invention will be described with reference to FIGS. 2-6.

First Embodiment

Figure 2:
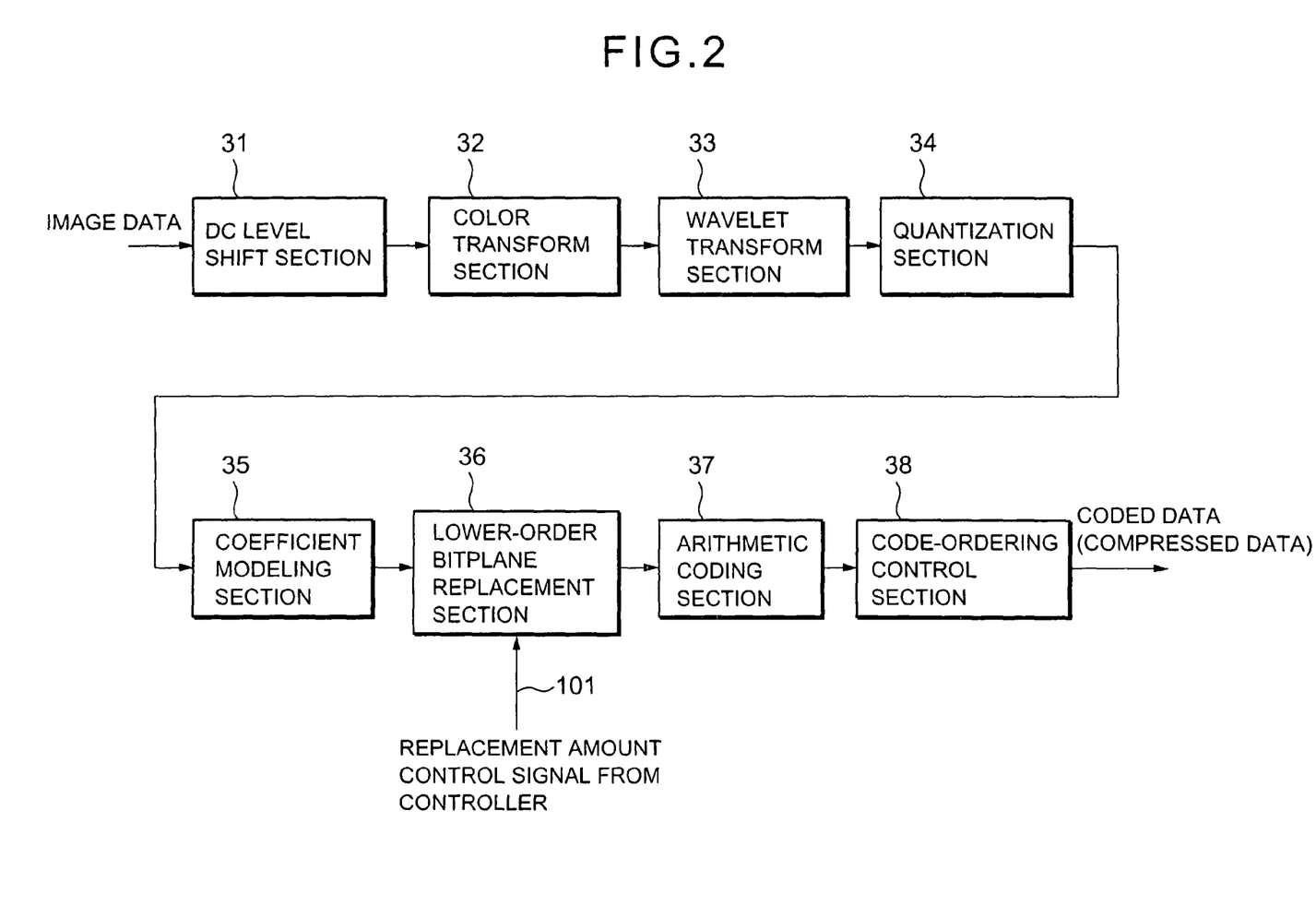
FIG. 2 is a block diagram showing a digital image coding device according to a first embodiment of the present invention.

As shown in FIG. 2, the JPEG2000 encoder 3 is functionally composed of a DC level shift section 31, a color transform section 32, a wavelet transform section 33, a quantization section 34, a coefficient modeling section 35, a lower-order bitplane replacement section 36, an arithmetic coding section 37 and a code-ordering control section 38. As described before, the JPEG2000 encoder 3 may be implemented by a program-controlled processor running a JPEG2000 coding program as shown in FIG. 3.

Figure 3:
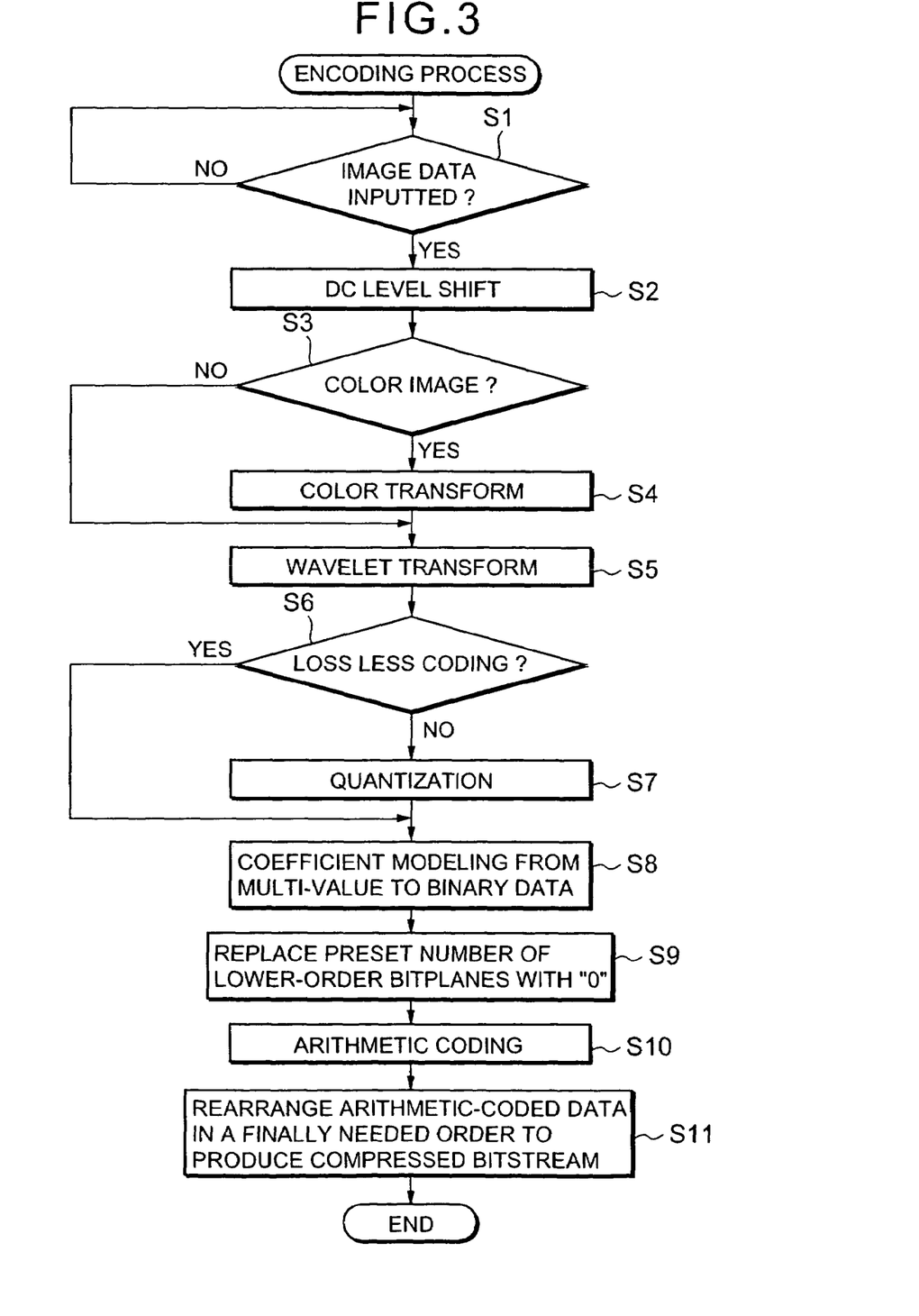
FIG. 3 is a flow chart showing an encoding process of the digital image coding device of FIG. 2.

Referring to FIG. 3, it is determined whether image data is inputted (step S1) and, when inputted (YES in step S1), the DC level shift section 31 performs DC level shift so as to enhance the efficiency of wavelet transform, which will be described later (step S2).

In the case of a multiple-component (e.g. RGB) image, the color transform section 32 performs the color transform (step S4), which will be described later. The color transform would be skipped if the input image data is a single component (e.g. gray level) image. Thereafter, the wavelet transform section 33 performs a wavelet transform of the input image data to produce wavelet coefficients for each subband (step S5). When lossy coding is performed (NO in step S6), the quantization section 34 performs quantization of all the wavelet coefficients (step S7) and, when lossless coding is performed (YES in step S6), the quantization (step S7) is not performed.

When inputting the quantized or not-quantized wavelet coefficients, the coefficient modeling section 35 performs coefficient modeling to convert multi-value or magnitude-represented coefficients into binary data which are composed of a number of bitplanes (step S8).

After the coefficient modeling, the lower-order bitplane replacement section 36 replaces as many lower-order bitplanes as designated by a replacement amount control signal 101 with "0" (step S9). As describe later, the lower-order bitplane replacement section 36 inputs the replacement amount control signal 101 from the controller 8.

The arithmetic coding section 37 performs the arithmetic coding of the binary data output from the lower-order bitplane replacement section 36 (step S10) and then the code-ordering control section 38 rearranges the arithmetic-coded data in a finally needed order to produce a compressed bitstream (step S11)

Figure 4A:
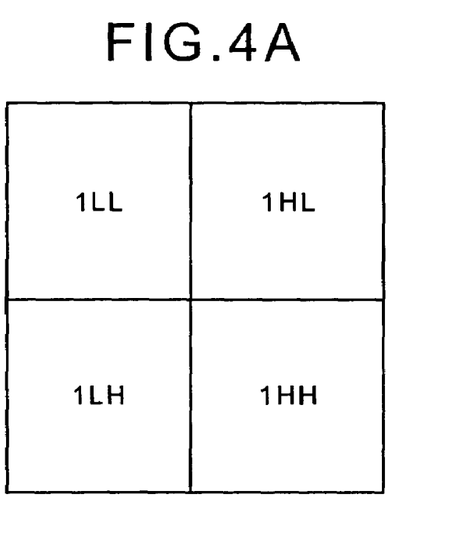
FIG. 4A is a diagram showing subband division at a decomposition level of 1.
Figure 4B:
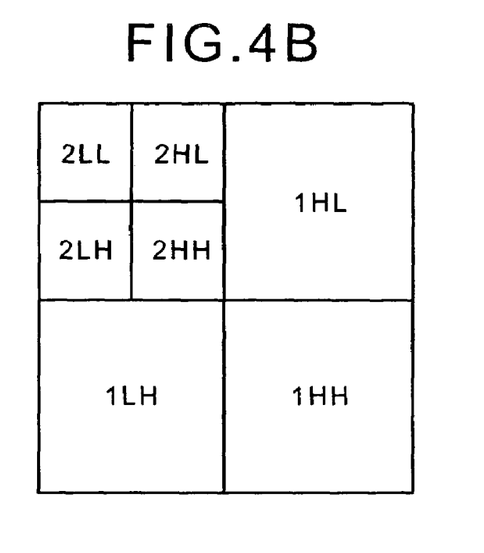
FIG. 4B is a diagram showing subband division at a decomposition level of 2.
Figure 5:
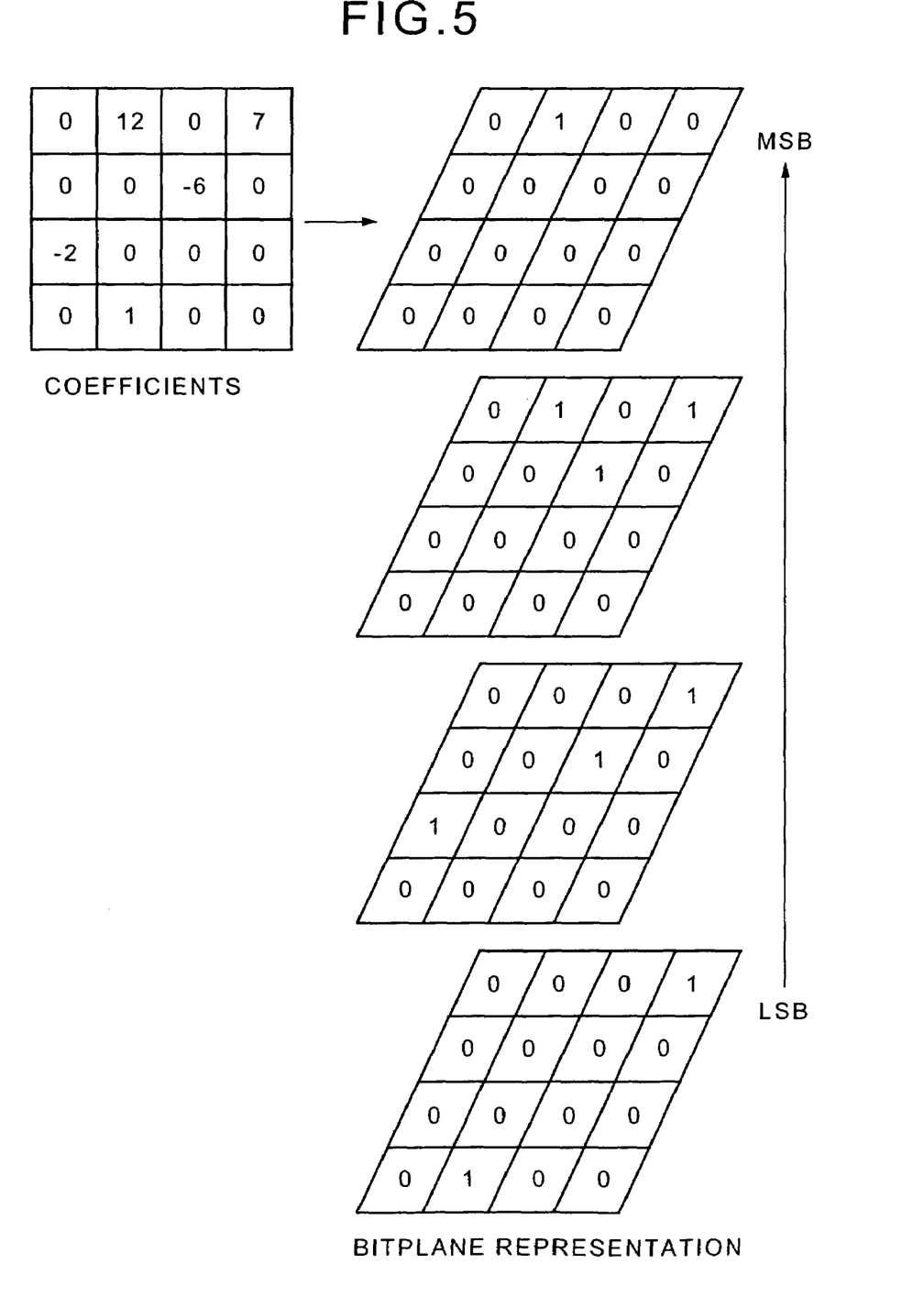
FIG. 5 is a diagram showing bitplane representation of a 4×4 code-block of coefficients.

A more detailed description of the JPEG2000 encoder 3 will be made taking as an example the case as shown in FIGS. 4-6. FIGS. 4A and 4B schematically show the cases of subband division at decomposition level 1 and decomposition level 2, respectively. FIG. 5 shows bitplane representation of a 4×4 code-block of coefficients. FIG. 6A shows image data having 192 levels of gray with a standard deviation of $\sigma=3$, which is obtained by scanning a uniform-intensity grayed document. FIGS. 6B-6E show four subband images obtained by wavelet-transforming the image data of FIG. 6A, respectively.

DC Level Shift and Color Transform

In the case of the input image consisting of multiple components of positive values (unsigned integers) such as RGB components, the DC level shift section 31 subtracts one half the dynamic range of the image signal from each component value. The color transform section 32 performs color transform so as to efficiently compress the color image. In the case of RGB signal, the RGB color space may be transformed to YCbCr or YUV color space.

Wavelet Transform

The wavelet transform section 33 performs a two-dimensional wavelet transform on the input image signal to produce wavelet coefficients by applying a one-dimensional wavelet transform vertically and horizontally. The one-dimensional wavelet transform is represented by the following equations:

$$Y(2n+1)=X(2n+1)-\text{floor}[(X(2n)+X(2n+2))/2] \quad (1); \text{ and}$$

$$Y(2n)=X(2n)+\text{floor}[(Y(2n+1)+Y(2n+1)+2)/4] \quad (2).$$

Here, the equation (1) represents High-pass filer, the equation (2) represents Low-pass filter, and floor[a] is a maximum integer not greater than a.

The wavelet transform section 33 applies the equations (1) and (2) in the width and height directions on the input image signal to produce four groups of wavelet coefficients, each group corresponding to subband 1LL, subband 1HL, subband 1HH, and subband 1LH as shown in FIG. 4A (Decomposition level 1). The subbands 1HL, 1HH and 1LH are also called "AC components". Further, the wavelet transform section 33 recursively applies the equations (1) and (2) in the width and height directions on the low-pass subband 1LL to produce subband 2LL, subband 2HL, subband 2HH, and subband 2LH as shown in FIG. 4B (Decomposition level 2). Similarly, the wavelet transform is recursively carried out on low-pass subbands to sequentially provide Decomposition levels 3, 4, . . . and so on.

Quantization

All wavelet coefficients obtained by the wavelet transform section 33 are subjected to scalar quantization or post quantization, allowing a dynamic range of the wavelet coefficients to be reduced and achieving efficient compression. Since these quantization methods are known well, the details thereof are omitted.

Coefficient Modeling

The coefficient modeling section 35 divides the wavelet coefficients into code-blocks for each subband and performs coefficient modeling to convert multi-value wavelet coefficients to binary data of bitplanes for each code-block.

As shown in FIG. 5, a 4×4 code-block of coefficients is converted into bitplanes. In this example, the maximum one of the wavelet coefficients is 12. Accordingly, four bitplanes are needed to represent the maximum value and the remaining higher-order bitplanes are all 0. In the case of 8-bit image data, the wavelet coefficients obtained by wavelet-transforming the 8-bit image data have a dynamic range of 10 bits. Therefore, in the example as shown in FIG. 5, the high-order six bitplanes are all "0" and are not subjected to coding. However, information on 0-bitplanes such as these high-order six bitplanes is needed to represent the dynamic range of the wavelet coefficients. The number of 0-bitplanes is embedded in the header of a packet and is used to be inserted into a code sequence. The bitplanes other than 0-bitplanes are subjected to arithmetic coding by the arithmetic coding section 37.

As described before, digital image data inputted from an image capturing device such as an image scanner or digital camera inevitably includes noises which are caused by image sensor, analog circuit, analog-to-digital converter, and the like. Accordingly, when an analog image signal is converted into digital form, several low-order bits of the digital image signal reflect noises and such noise-reflected digital image signal is converted into coefficients by the wavelet transform, resulting in the coefficients to be subject to code modeling having magnitudes influenced by the noises.

The noise characteristic of an image capturing device to be used can be detected by capturing a uniform-intensity colored or grayed document (reference image) and quantifying variations in output level. In the case of an image scanner, for example, a sheet of white paper is scanned to produce an image signal, based on which the noise characteristic of the image scanner can be quantified. The quantified noise characteristic data may be stored in the memory 9 under the control of the controller 8. The noise characteristic of the image scanner may be detected at regular intervals or at the time when the image scanner starts up and the detected noise characteristic may be stored in the memory under the control of the controller 8.

Taking standard deviation as an example of quantification, a standard deviation σ is calculated by the following equation:

$$\sigma = [(\Sigma(D_i - D)^2)/n]^{1/2} \quad (3)$$

wherein i is a position in an image read from a uniform-intensity colored document, $D_i$ is a detected intensity at i, D is an average of detected intensities in the image, and n is the number of detected intensities in the image. In the case of σ=3, low-order three bits of a digital image signal are considered to reflect noises. In general, a high-speed image scanner has a noise characteristic represented by a standard deviation of 3.

Figure 6A:
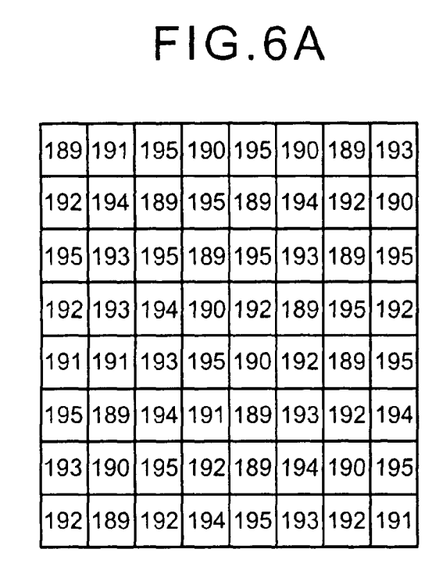
FIG. 6A is a diagram showing an example of image data with 192 levels of gray.
Figure 6B:
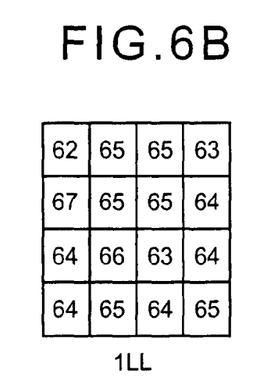
FIGS. 6B-6E are diagrams each showing four subband images obtained by wavelet-transforming the image data of FIG. 6A.
Figure 6C:
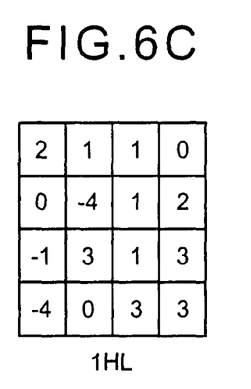
Figure 6D:
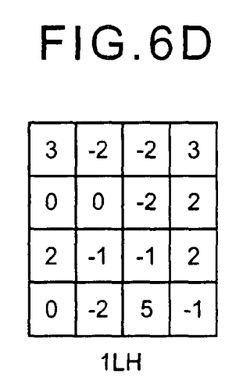
Figure 6E:
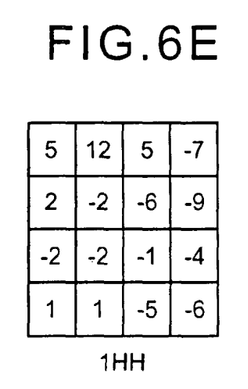

As shown in FIG. 6A, it is assumed that a uniform-intensity grayed document is scanned to produce image data having 192 levels of gray with a standard deviation of σ=3. In FIG. 6A, a possible intensity of each pixel ranges from 189 (=192−3) to 195 (=192+3).

In this case, the maximum value (absolute value) of wavelet coefficients in the AC components (1HL, 1LH and 1HH) is "12" as shown in FIG. 5. Accordingly, in the case of σ=3, the low-order four bitplanes are considered to reflect noises. Similarly, in the case of σ=2, the low-order three bitplanes are considered to reflect noises. In the case of σ=1, the low-order two bitplanes are considered to reflect noises.

These low-order several bitplanes represent noise information to be eliminated. Accordingly, when the wavelet coefficients are coded as they are, the amount of coded data is unnecessarily increased. To avoid such unnecessary data coding, the lower-order bitplane replacement section 36 is connected after the coefficient modeling section 35 before the arithmetic coding section 37 to replace a designated number of lower-order bitplane with 0.

Lower-Order Bitplane Replacement

The lower-order bitplane replacement section 36 replaces a designated number of lower-order bitplanes with 0. When the number of lower-order bitplanes to be replaced with 0 is equal to or lower than the number of low-order bitplanes reflecting noises as described above, such replacement has no adverse effect on image quality.

When coding a designated number of lower-order bitplanes replaced with 0, little coded data is generated. Accordingly it is considered that the designated number of lower-order bitplanes do not exist, achieving remarkably greater compression rates. In case of σ=3, as described before, the low-order four bitplanes are replaced with 0. Therefore, the number of bitplanes to be arithmetic-coded decreases from 10 to 6 and thereby the compression rate is improved by about 40%. In case of σ=2, as described before, the low-order three bitplanes are replaced with 0. Therefore, the number of bitplanes to be arithmetic-coded decreases from 10 to 7 and thereby the compression rate is improved by about 30%. In case of σ=1, as described before, the low-order two bitplanes are replaced with 0. Therefore, the number of bitplanes to be arithmetic-coded decreases from 10 to 8 and thereby the compressions rate is improved by about 20%. In this manner, by previously determining the number of bitplanes to be replaced with 0 depending on the noise characteristic of an image capturing device or the like, noise components included in the input image data can be effectively removed without deteriorating image quality and the compression rate can be improved.

It can be considered that noise components are removed from input image data before JPEG2000 compression In the case of 8-bit image data including low-order three bits reflecting noise (σ=3), only the high-order five bits of the image data are subjected to wavelet transform to produce wavelet coefficients having a dynamic range of 7 bits, which is greater than the dynamic range of 6 bits obtained by the present embodiment as described above. Accordingly, compared with this noise removal method, the present embodiment can achieve higher compression rates. It is the same with the cases of σ=2 and σ=1.

Second Embodiment

Figure 7:
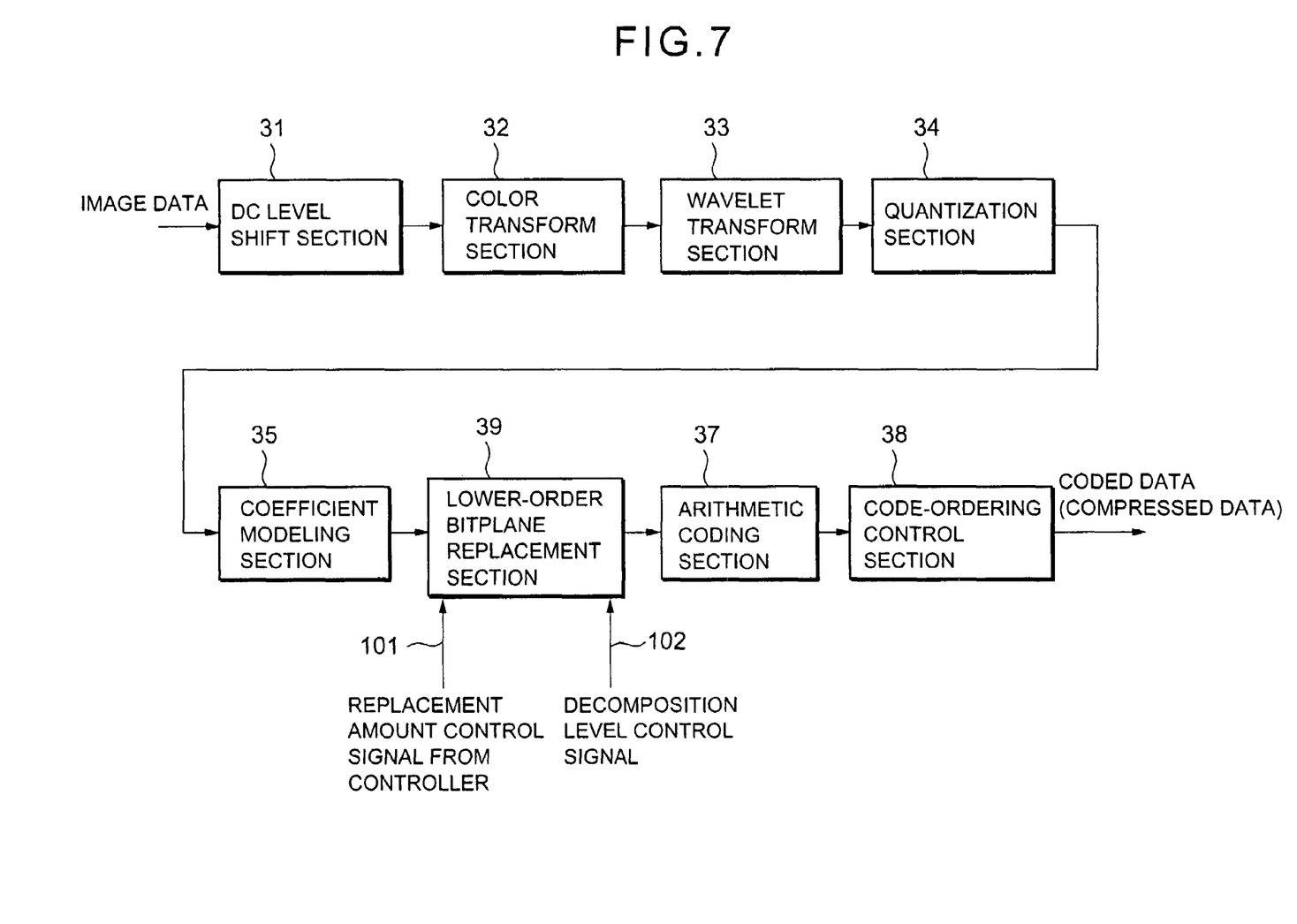
FIG. 7 is a block diagram showing a digital image coding device according to a second embodiment of the present invention.

Referring to FIG. 7, a JPEG2000 encoder 3 according to a second embodiment of the present invention is provided with a lower-bitplane replacement section 39 in place of the lower-order bitplane replacement section 36. The remaining blocks 31-35 and 37-38 similar to those previously described with reference to FIG. 2 are denoted by the same reference numerals and the details thereof will be omitted.

The lower-bitplane replacement section 39 replaces a number of lower-order bitplanes designated by the replacement amount control signal 101 with 0 for the AC components of at least one decomposition level designated by a decomposition level control signal 102. The decomposition level control signal 102 can designate one or more decomposition level. Both the replacement amount control signal 101 and the decomposition level control signal 102 may be inputted from the controller 8.

As described before, the wavelet transform section 33 recursively applies the equations (1) and (2) in the width and height directions on the low-pass subband at Decomposition level i to produce a low-pass component and AC components at Decomposition level (i+1). Accordingly, a designated number of lower-order bitplanes in the AC components at Decomposition level designated by the decomposition level control signal 102 are replaced with 0. Compared with the case where a designated number of lower-order bitplanes in only the highest-resolution AC components (at Decomposition level 1) are replaced with 0, the second embodiment can achieve further improved compression rate.

Alternatively, it is possible to replace only a designated number of lower-order bitplanes at Decomposition level designated by the decomposition level control signal 102 without replacing a designated number of lower-order bitplanes at the Decomposition level 1.

Figure 8:
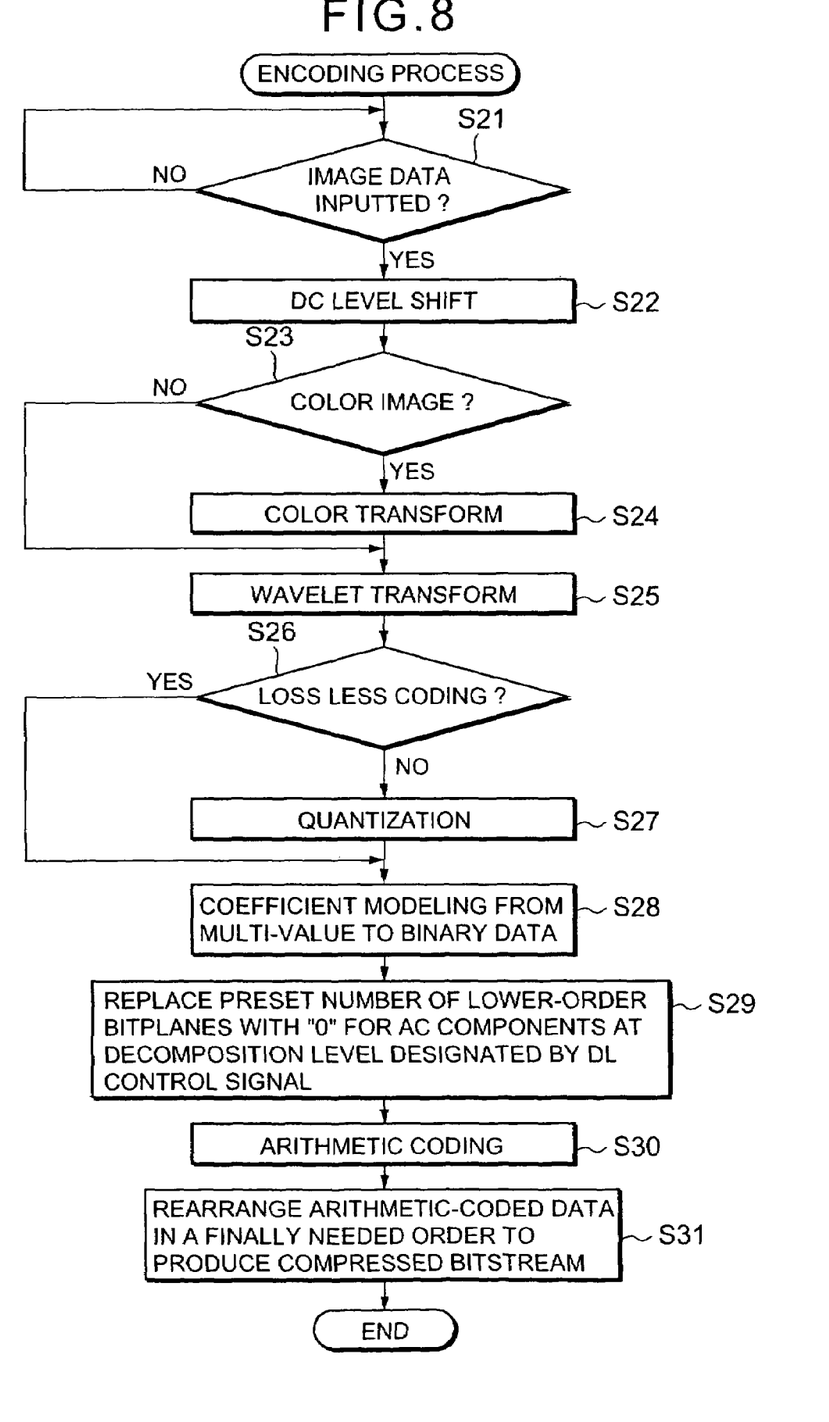
FIG. 8 is a flow chart showing an encoding process of the digital image coding device of FIG. 7.

In FIG. 8, steps S21-S28 and S30-S31 are the same as the steps S1-S8 and S10-S11 of FIG. 3 and therefore the details will be omitted.

In the step S29, the lower-order bitplane replacement section 39 replaces as many lower-order bitplanes as designated by a replacement amount control signal 101 with "0" for AC components at Decomposition level designated by the decomposition level control signal 102. In this manner, by previously determining the number of bitplanes to be replaced with 0 depending on the noise characteristic of an image capturing device or the like and further determining a decomposition level to be subjected to the above replacement, noise components included in the input image data can be effectively removed without deteriorating image quality and the compression rate can be further improved with flexibility.

The invention claimed is:

1. A device for coding a digital image signal inputted from an image capturing device based on wavelet transform, comprising:
   a coefficient modeling section for converting wavelet coefficients into binary data composed of a plurality of bitplanes for each code-block;
   a replacement section for replacing a designated number of lower-order bitplanes of the plurality of bitplanes with zero to produce modified binary data, wherein the designated number of low-order bitplanes is designated depending on a noise characteristic of the image capturing device caused by a component of the image capturing device; and
   an arithmetic coding section for coding bitplanes of the modified binary data.

2. The device according to claim 1, wherein the lower-order bitplanes to be replaced with zero belong to AC components at a minimum decomposition level.

3. The device according to claim 1, wherein the noise characteristic of the image capturing device is obtained by capturing a reference image having a uniform intensity and quantizing an intensity deviation of a captured image.

4. The device according to claim 1, wherein the lower-order bitplanes to be replaced with zero belong to AC components at a designated one of a predetermined number of decomposition levels.

5. A method for coding a digital image signal inputted from an image capturing device based on wavelet transform, comprising the steps of:
   converting wavelet coefficients into binary data composed of a plurality of bitplanes for each code-block;
   designating a number of low-order bitplanes of the plurality of bitplanes depending on a noise characteristic of the image capturing device caused by a component of the image capturing device;
   replacing a designated number of lower-order bitplanes with zero to produce modified binary data; and
   coding bitplanes of the modified binary data by arithmetic coding.

6. The method according to claim 5, wherein the lower-order bitplanes to be replaced with zero belong to AC components at a minimum decomposition level.

7. The method according to claim 5, wherein the noise characteristic of the image capturing device is obtained by capturing a reference image having a uniform intensity and quantizing an intensity deviation of a captured image.

8. The method according to claim 5, further comprising the step of designating one of a predetermined number of decomposition levels, wherein the lower-order bitplanes to be replaced with zero belong to AC components at the designated decomposition level.

9. A computer readable medium storing a computer program instructing a computer to coding a digital image signal inputted from an image capturing device based on wavelet transform, the computer program comprising the steps of:
   converting wavelet coefficients into binary data composed of a plurality of bitplanes for each code-block;
   designating a number of low-order bitplanes of the plurality of bitplanes depending on a noise characteristic of the image capturing device caused by a component of the image capturing device;
   replacing a designated number of lower-order bitplanes with zero to produce modified binary data; and
   coding bitplanes of the modified binary data by arithmetic coding.

* * * * *